(12) United States Patent
Coda et al.

(10) Patent No.: US 7,858,024 B2
(45) Date of Patent: Dec. 28, 2010

(54) NON-EVAPORABLE GETTER ALLOYS BASED ON YTTRIUM FOR HYDROGEN SORPTION

(75) Inventors: Alberto Coda, Gerenzano (IT); Alessio Corazza, Como (IT); Alessandro Gallitognotta, Origgio (IT); Luca Toia, Carnago (IT); Paola Baronio, Caronno Pertusella (IT); Magda Bovisio, Milan (IT)

(73) Assignee: Saes Getters S.p.A., Lainate MI (IT)

( * ) Notice: Subject to any disclaimer, the term of this patent is extended or adjusted under 35 U.S.C. 154(b) by 237 days.

(21) Appl. No.: 12/297,664

(22) PCT Filed: May 29, 2007

(86) PCT No.: PCT/IT2007/000373

§ 371 (c)(1),
(2), (4) Date: Oct. 20, 2008

(87) PCT Pub. No.: WO2007/148362

PCT Pub. Date: Dec. 27, 2007

(65) Prior Publication Data

US 2009/0148635 A1 Jun. 11, 2009

(30) Foreign Application Priority Data

Jun. 19, 2006 (IT) .......................... MI2006A1173

(51) Int. Cl.
*C22C 28/00* (2006.01)

(52) U.S. Cl. ....................... 420/416; 420/434; 420/553; 420/528; 252/181.6; 95/116

(58) Field of Classification Search ................. 420/434, 420/553, 528, 416; 252/181.6; 95/116
See application file for complete search history.

(56) References Cited

U.S. PATENT DOCUMENTS 3,203,901 A 8/1965 Della Porta
5,961,750 A 10/1999 Boffito et al.

FOREIGN PATENT DOCUMENTS

GB 1 248 184 9/1971

(Continued)

OTHER PUBLICATIONS

M. Shiga et al., "Charcteristic spin fluctuations in Y(Mn1-xA1x)2", Journal of Physics F: Metal Physics, vol. 17, No. 8, pp. 1781-1793, (1987).

(Continued)

*Primary Examiner*—Michael C Miggins
(74) *Attorney, Agent, or Firm*—Panitch Schwarze Belisario & Nadel LLP

(57) ABSTRACT

Non-evaporable getter alloys, such as Y 75%-Mn 15%-Al 10%, are provided and can be activated at relatively low temperatures and have good properties in sorbing a wide variety of gases, particularly hydrogen.

9 Claims, 6 Drawing Sheets

FOREIGN PATENT DOCUMENTS

| WO | 03/029502 A2 | 4/2003 |
|---|---|---|
| WO | 2006/057020 A1 | 6/2006 |

OTHER PUBLICATIONS

R. Richter et al., "The Crystallization characteristics of Y-Al metallic glasses", Journal of Materials Science Letters, vol. 4, pp. 1005-1009, (1985).

Ch. Hauslietner et al., "Structural and electronic properties of Y-based metallic glasses", Journal of Physics: Condensed Matter, vol. 4, No. 48, pp. 9557-9572, (1992).

K. Fukamichi et al., "Refrigerant Characteristics of R-Al and R-Si Amorphous Alloys", Science Reports of the Research Institutes, Tohoku University, vol. 36, No. 1, pp. 48-58, (1991).

Y. Obi et al., "Magnetization and AC-Susceptibility of Amorphous Mn-Y and Mn-La Alloys", Journal De Physique, vol. 49, No. 12, pp. 1097-1098, (1988).

Faqiang Guo et al., "Metallic glass ingots based on yttrium", Applied Physics Letters, American Institute of Physics, vol. 83, No. 13, pp. 2575-2577, (2003).

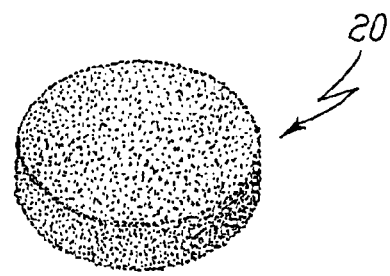
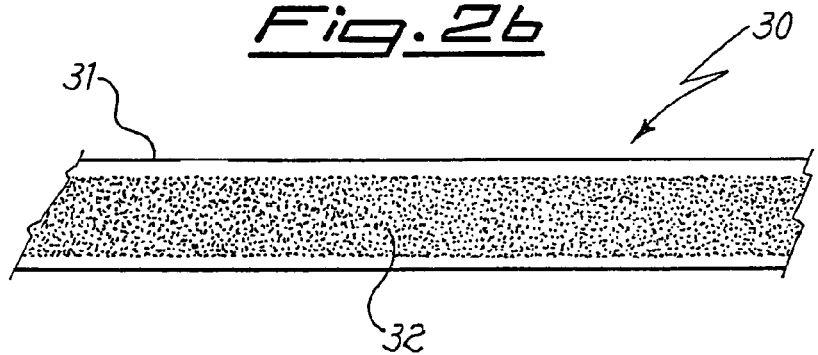
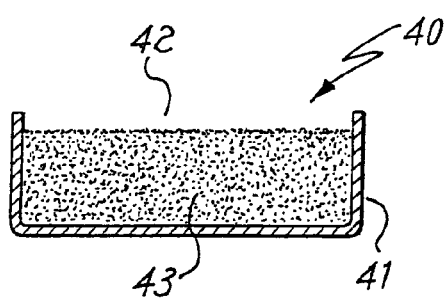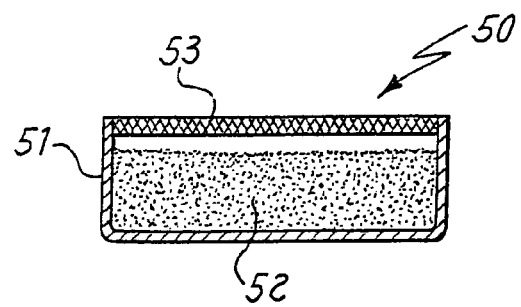

NON-EVAPORABLE GETTER ALLOYS BASED ON YTTRIUM FOR HYDROGEN SORPTION

CROSS-REFERENCE TO RELATED APPLICATIONS

This application is a Section 371 of International Application No. PCT/IT2007/000373, filed May 29, 2007, which was published in the English language on Dec. 27, 2007, under International Publication No. WO 2007/148362 A3 and the disclosure of which is incorporated herein by reference.

BACKGROUND OF THE INVENTION

The present invention is directed to non-evaporable getter alloys capable of sorbing different gases but particularly useful for the sorption of hydrogen.

Many applications in the field of industry or research require, for their correct working, vacuum or a filling with an atmosphere of a given gas (or gas mixture) in a closed container. Examples are evacuated jackets for thermal insulation (e.g., in thermal bottles, also known as "thermos", or solar collectors), in which in particular the presence of hydrogen is detrimental owing to the high thermal conductivity of this gas; plasma displays; or X-ray generating tubes. The processes for manufacturing these devices comprise a step of container evacuation and possible back-filling thereof with a desired gas. However, these processes always leave traces of undesired gases in the final device. Besides, in the case of hydrogen, whenever a high vacuum or a hydrogen-free gas are produced, mechanisms exist which cause hydrogen gas to re-enter the system. These mechanisms are mainly the outgassing of the container walls and the hydrogen permeation across these walls from the external atmosphere toward the container, thus leading to problems in the correct operation of the devices. Owing to the same mechanisms, hydrogen also represents the main contribution to the residual pressure in ultra-high vacuum (UHV) systems, such as the particle accelerators employed in the research field.

To remove traces of unwanted gases from evacuated or gas-filled spaces, it is known to employ non-evaporable getter materials (known in the field as NEG materials, or simply as NEGs), i.e., materials being capable of chemically binding molecules of gases such as water, oxygen, hydrogen, carbon oxides and, in some cases, nitrogen. In order to accomplish their function, NEGs generally require an initial treatment of thermal activation at temperatures that can vary between about 300° C. up to about 900° C. during a time comprised between a few minutes up to several hours, depending on the material composition.

NEGs are generally metals of the transition groups III, IV and V or alloys thereof with other elements, generally other transition metals or aluminum. The most used getter materials are titanium- and, particularly, zirconium-based alloys.

NEG materials show a sorption behavior with respect to hydrogen which is different from that of other gases. While for most gases the chemical sorption by these alloys is irreversible, the sorption of hydrogen by NEGs is an equilibrium process reversible as a function of the temperature. Hydrogen is efficiently sorbed at relatively low temperatures (under 200-400° C., according to the chemical composition of the material), but it is released at higher temperatures. The equilibrium features of these materials in sorbing hydrogen are generally represented graphically by means of curves giving, at different temperatures, the equilibrium pressure of hydrogen over the NEG material as a function of the hydrogen concentration in the same material.

Advantageous features for a NEG material are a low activation temperature and, when hydrogen sorption is considered, a low hydrogen equilibrium pressure in the entire range of temperatures at which the material is to be used.

NEG materials especially suitable for hydrogen sorption are pure yttrium and an alloy disclosed in U.S. Pat. No. 3,203,901 which contains, by weight, 84% zirconium and 16% aluminum. Both of these materials require, however, relatively high temperatures for their activation, in the range of about 700-900° C. (depending on the degree of activation desired). British Pat. No. 1,248,184 and International Patent Application Publication No. WO 03/029502 disclose yttrium-rich materials, whose properties are essentially the same as those of pure yttrium. Another problem with the materials of British Pat. No. 1,248,184 is that the materials are essentially mixtures of pure metals, so that at high temperatures they can give rise to evaporation of the metal admixed with yttrium.

Another material widely employed for hydrogen sorption is an alloy having approximate composition, by weight, of 80% zirconium, 15% cobalt and 5% mischmetal (a commercial mixture of lanthanum and/or cerium and Rare Earths), disclosed in U.S. Pat. No. 5,961,750. This material has the drawback of a relatively high hydrogen equilibrium pressure at temperatures in excess of about 500° C.

Finally, International Patent Application Publication No. WO 2006/057020 discloses alloys containing zirconium (as the main component), yttrium and one or more elements chosen among aluminum, iron, chromium, manganese and vanadium for use in hydrogen sorption. The materials of International Patent Application Publication No. WO 2006/057020 have lower activation temperatures compared to the previously mentioned ones. However, they have very poor sorption characteristics for other gases, such as nitrogen.

BRIEF SUMMARY OF THE INVENTION

An object of the present invention is to provide non-evaporable getter alloys that can sorb a wide variety of gasses, and with especially good hydrogen sorption properties.

According to the present invention, this object is achieved with non-evaporable getter alloys comprising, by weight, from 60% to 85% yttrium, from 5% to 30% manganese and from 5% to 20% aluminum.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 2a-2d are schematic perspective, plan, and cross-sectional views of some possible embodiments of non-evaporable getter devices made by using the alloys of the invention;

DETAILED DESCRIPTION OF THE INVENTION

Figure 1:
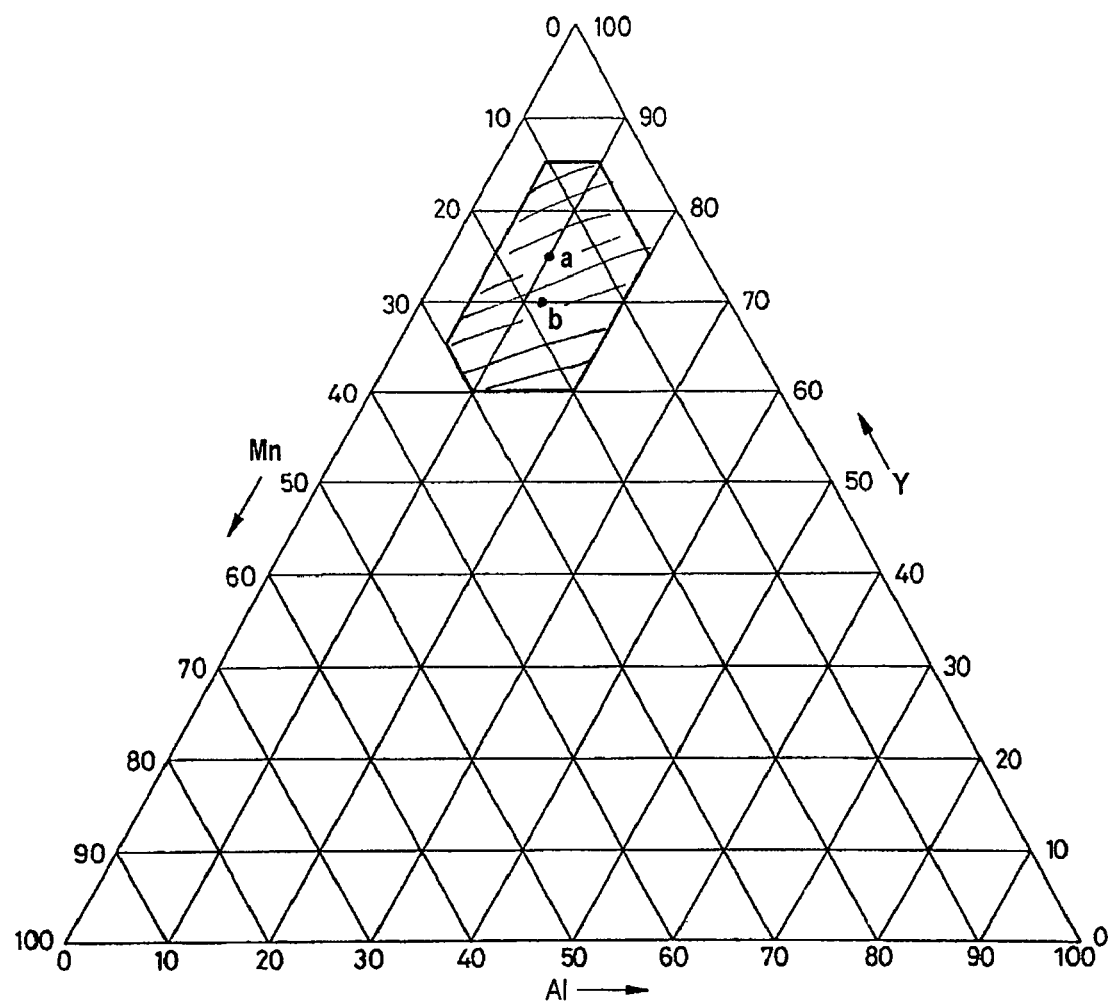
FIG. 1 is a ternary diagram representing the range of possible compositions of the NEG alloys according to the invention.

The alloys of the invention are those falling within the polygon identified in the ternary diagram of weight percentage compositions of FIG. 1.

Among these, preferred are the compositions Y 75%-Mn 15%-Al 10% and Y 70%-Mn 18%-Al 12%, represented in FIG. 1 as points a and b, respectively.

The alloys of the invention can be prepared by melting in a furnace, for example, pieces or powders of the component metals, used in the mutual ratios corresponding to the desired final composition. Preferred are the techniques of arc melting under an inert gas, e.g., with a pressure of $3\times10^4$ Pascal (Pa) of argon, or in an induction furnace, under vacuum or inert gas. It is, however, possible to adopt other techniques which are common in the metallurgical field for preparing alloys. Melting requires temperatures higher than 1000° C.

For the production of getter devices using the alloys of the invention, the getter material may be in the form of pills of the getter material alone or made with the latter either on a support or in a container. It is preferred to use the alloys in powder form, with particle size generally lower than 250 micrometers ($\mu m$) and preferably comprised between 40 and 125 $\mu m$. Greater particle sizes result in an excessive reduction of the specific surface (surface area per unit weight) of the material, with consequent reduction of the gas sorption properties, in particular the sorption speed at low temperatures. Although their use is possible and required in some applications, particles of size less than 40 $\mu m$ may give rise to problems in the manufacturing steps of getter devices, especially due to their flammability/explosivity when exposed to air.

The shapes in which the getter devices can be prepared by using the alloys of the invention are the most various, comprising pills formed of the getter alloy powders alone, or of these on a metallic support. In both cases the powders can be compacted either by compression or sintering, or both. The pills made only of compressed powders may be used, for example, in the thermal insulation of thermoses. When the powders are supported, steel, nickel or nickel-based alloys are generally used as supporting material. The support can merely be in the form of a strip on the surface of which the alloy powders are caused to adhere by either cold rolling or sintering after deposition by means of various techniques. The support can also be formed as an actual container, having the most various shapes, in which the powders are generally introduced by compression or even without compression in some devices in which the container has the capability to retain powders, either due to its shape or because it is provided with a porous septum permeable to gas flow. Some of these possibilities are illustrated in FIGS. 2a-2d. FIG. 2a is a schematic top perspective view of a pill 20 made of compressed powders only of NEG alloy. FIG. 2b is a schematic plan view of an NEG device 30 formed of a metallic strip 31 on which powders 32 of NEG alloy are present. FIG. 2c is a schematic cross-sectional side view of an NEG device 40 formed of a metallic container 41 with an upper opening 42 having at the inside thereof powders 43 of NEG alloy. FIG. 2d is a schematic cross-sectional side view of an NEG device 50 consisting of a metallic container 51 having inside powders 52 of NEG alloy with an upper opening closed by a porous septum 53. A number of other shapes and configurations of devices using the getter alloys of the invention are possible.

The NEG alloys of the invention can be activated by means of treatments of a few tens of minutes at 500° C. or at about 300° C. for one or two hours, which are milder conditions than those typically required by pure yttrium or zirconium-aluminum alloys (these latter needing temperatures of about 800-900° C.). Furthermore, the NEG alloys of the invention show good properties of hydrogen sorption at temperatures lower than those required by using yttrium or compositions of the prior art containing this element as the main component. At the same time, the alloys of the invention show better properties as to sorption of gases different from hydrogen compared to the previously described getter alloys of the prior art (generally containing zirconium as the main component).

The invention will be further illustrated by the following examples. These non-limiting examples describe some embodiments intended to teach those skilled in the art how to put into practice the invention and to represent the best considered mode for carrying out the invention. In the examples, all compositions of the alloys are given as percent by weight of the elements, unless specified otherwise.

Example 1

This example describes the preparation of an alloy of the invention.

An alloy of composition Y 75%-Mn 15%-Al 10%, corresponding to point a in the ternary diagram of FIG. 1, is produced starting from powders of the component elements weighed in the desired ratio. The powders are mixed and poured into a water cooled copper crucible of an arc furnace under an atmosphere of $3\times10^4$ Pa of argon (so-called "cold-earth" technique). The temperature reached by the mixture during melting is of about 2000° C. and is maintained for about 5 minutes. The melt is then allowed to cool down to room temperature, obtaining an ingot of the alloy. Since the preparation takes place under conditions of high thermal gradient, in order to enhance the alloy homogeneity, the melting is repeated four times. The ingot obtained by cooling after the fourth melting is milled and the resulting powder is finally sieved, retrieving the fraction with particle size comprised between 40 and 105 $\mu m$.

The thus obtained powder is used to prepare several pills which are used in the gas-sorption tests described below. Each of the pills, referred to as "sample 1" in the following, are obtained by compressing 120 mg of powder under a pressure of 2000 $kg/cm^2$.

Example 2

A hydrogen sorption test is carried out on a pill of sample 1 and on a pill having a weight of 120 mg obtained by compressing powders of pure yttrium. The pills are activated at 500° C. for 30 minutes. The sorption tests are carried out according to the procedure described in the ASTM F 798-82 standard with a test temperature of 400° C. and a hydrogen pressure of $4\times10^{-3}$ Pa. These tests are said to take place under "dynamic conditions" because the test chamber is fed with a variable flow of hydrogen, regulated by means of a feed-back system, in order to have a constant pressure of $H_2$ over the pill during the test. The results of these tests are graphically represented in FIG. 3 as sorption speed, S, measured as cubic centimeters of hydrogen sorbed per second and per gram of alloy (cc/s×g), as a function of the quantity of sorbed hydrogen, Q, measured as cubic centimeters of gas multiplied by the sorption pressure in hectoPascal and normalized per gram of sample (cc×hPa/g). Curve 1 corresponds to the pill of sample 1, while the curve corresponding to the pure yttrium sample is labeled Y.

Example 3

In this example are measured the hydrogen equilibrium pressure properties of a sample of an alloy of the invention.

The measurement system is formed as a glass bulb, connected to a pumping apparatus through a liquid nitrogen trap which helps to keep a low background pressure during the test. The sample is heated from the outside of the bulb by radio-frequencies by means of an induction coil. The system is evacuated until a residual pressure of $1\times10^{-4}$ Pa is reached. Under pumping, the sample is activated by heating with radio-frequency at 700° C. for an hour. At the end of the activation process, the sample is brought to a temperature of 600° C. and the bulb is isolated from the pumping apparatus. A measured quantity of hydrogen is introduced into the bulb and the pressure variations are measured by means of a capacitance manometer. The pressure value at which the system stabilizes provides the equilibrium pressure under those conditions. Such a procedure is repeated several times, introducing each time a different quantity of hydrogen into the system. From the measurement of the equilibrium pressures, the system volume and the weight of the sample being known, the concentration of hydrogen sorbed by the sample under the different measurement conditions is obtained.

Figure 4:
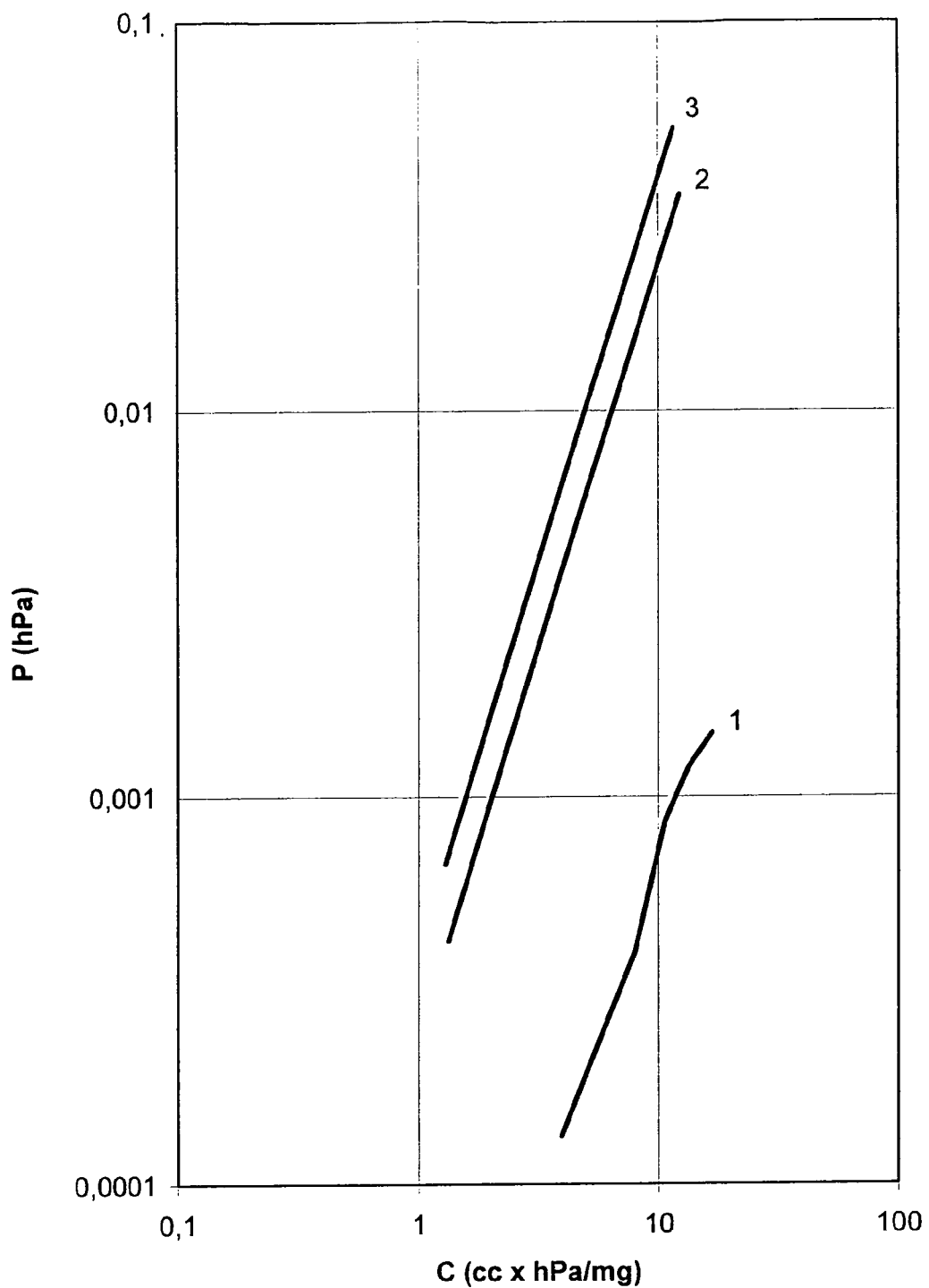

With the measurement system and procedure above described, the values of equilibrium pressure of hydrogen over a pill of sample 1 are measured. These values are graphically represented as curve 1 in FIG. 4, showing the equilibrium pressure, P, measured in hectoPascals (hPa), as a function of the sorbed hydrogen concentration, C, measured in cubic centimeters of gas multiplied by the sorption pressure and normalized per milligram of alloy (cc×hPa/mg). For comparison, in the same graph are also shown two segments representing the hydrogen equilibrium properties of two prior art materials, considered in the field as particularly suitable for the sorption of hydrogen. In particular, segment 2 represents the properties of an alloy of composition Zr 84%-Al 16% (whose features and preparation are described in U.S. Pat. No. 3,203,901), while segment 3 represents the properties of an alloy of composition Zr 80.8%—Co 14.2%-mischmetal 5.0% (known from U.S. Pat. No. 5,961,750). Segments 2 and 3 are portions of lines obtained by averaging the data resulting from a number of experimental tests carried out in the past with the known alloys in the same conditions as described above for sample 1.

Example 4

The tests of example 3 are repeated, measuring in this case the hydrogen equilibrium pressure at 700° C. of pills corresponding to sample 1 and to the same Zr—Al and Zr—Co-mischmetal alloys. The results of these tests are graphically represented in FIG. 5, again with curve 1 representing the properties of sample 1 and segments 2 and 3 representing the properties of the Zr—Al alloy and of the Zr—Co-mischmetal alloy, respectively.

Example 5

A series of carbon monoxide (CO) sorption tests are carried out on a pill of sample 1 and on pills of the same Zr—Al and Zr—Co-mischmetal alloys of example 3. These pills of prior art alloys have the same weight of the pill of sample 1. These tests are carried out under "dynamic conditions", according to the standard ASTM F 798-82, as described in example 2. The pills are activated at 500° C. for 10 minutes, and the tests are carried out at 400° C., with a constant CO pressure of $4\times10^{-3}$ Pa. The results of these tests are reported graphically in FIG. 6, as CO sorption speed (measured in cubic centimeters of CO per second, cc/s) as a function of the quantity of CO sorbed (measured in cubic centimeters of sorbed CO multiplied by the test pressure, cc×hPa).

Discussion of the Results

Figure 3:
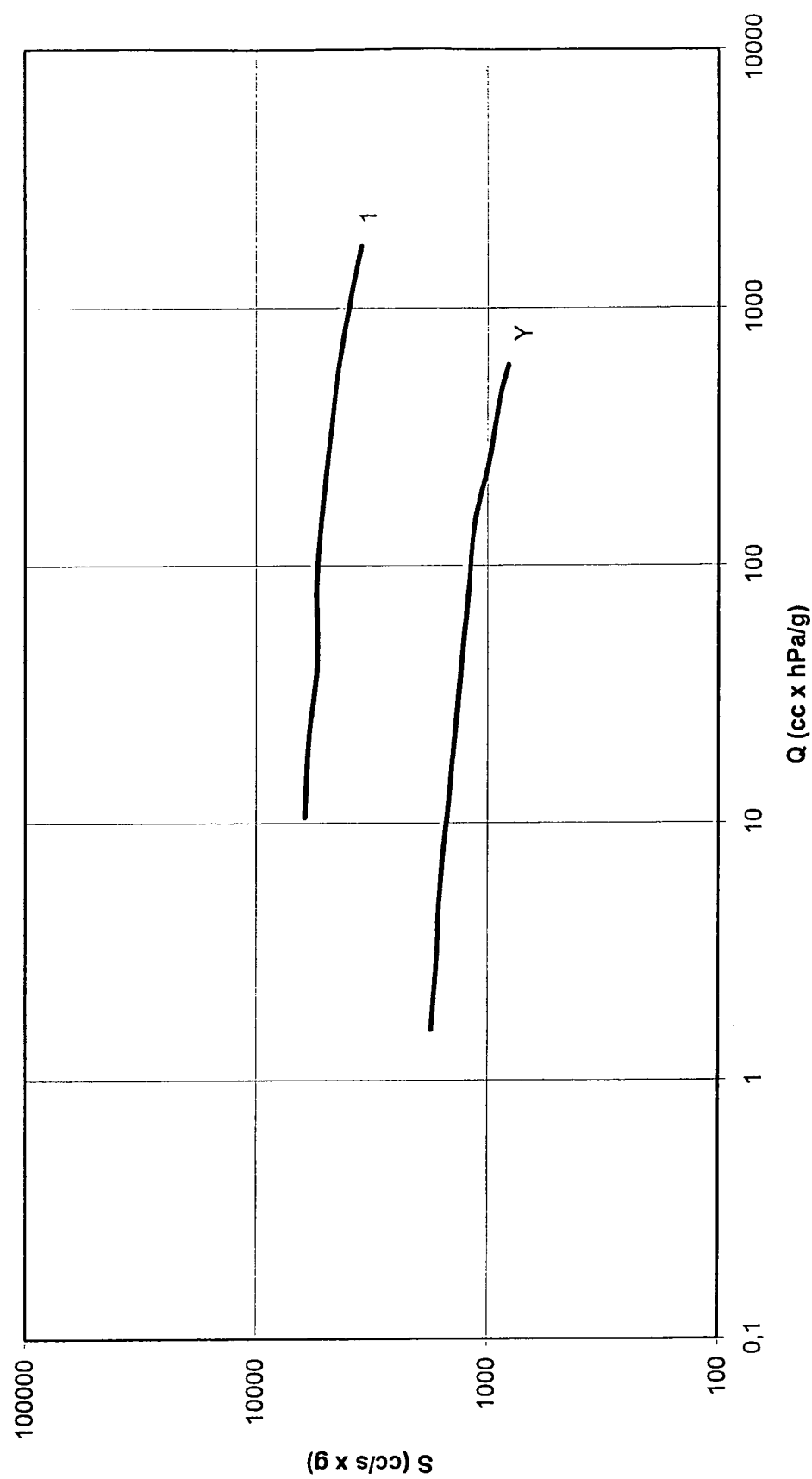
FIGS. 3 to 6 are graphs showing the gas sorption features of alloys according to an embodiment of the invention and of some getter materials of the prior art.

The graph of FIG. 3 confirms that the alloys according to an embodiment of the invention have better hydrogen sorption properties than those of a sample of pure yttrium activated under the same conditions.

Figure 5:
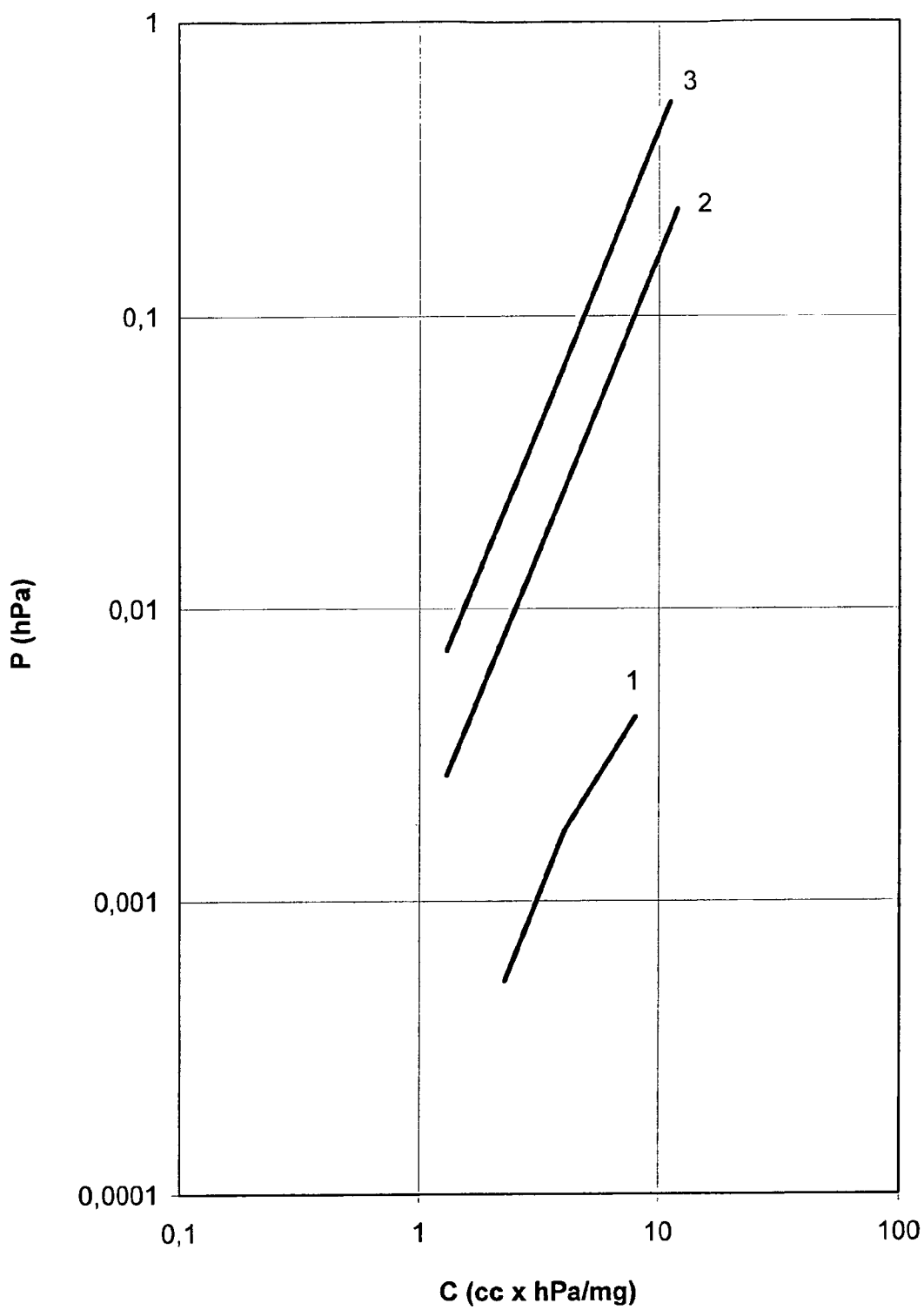

The graphs of FIGS. 4 and 5 show that the alloys according to an embodiment of the invention have better hydrogen equilibrium properties compared to two alloys of the prior art that are considered in the field as having particularly good features regarding this parameter.

Figure 6:
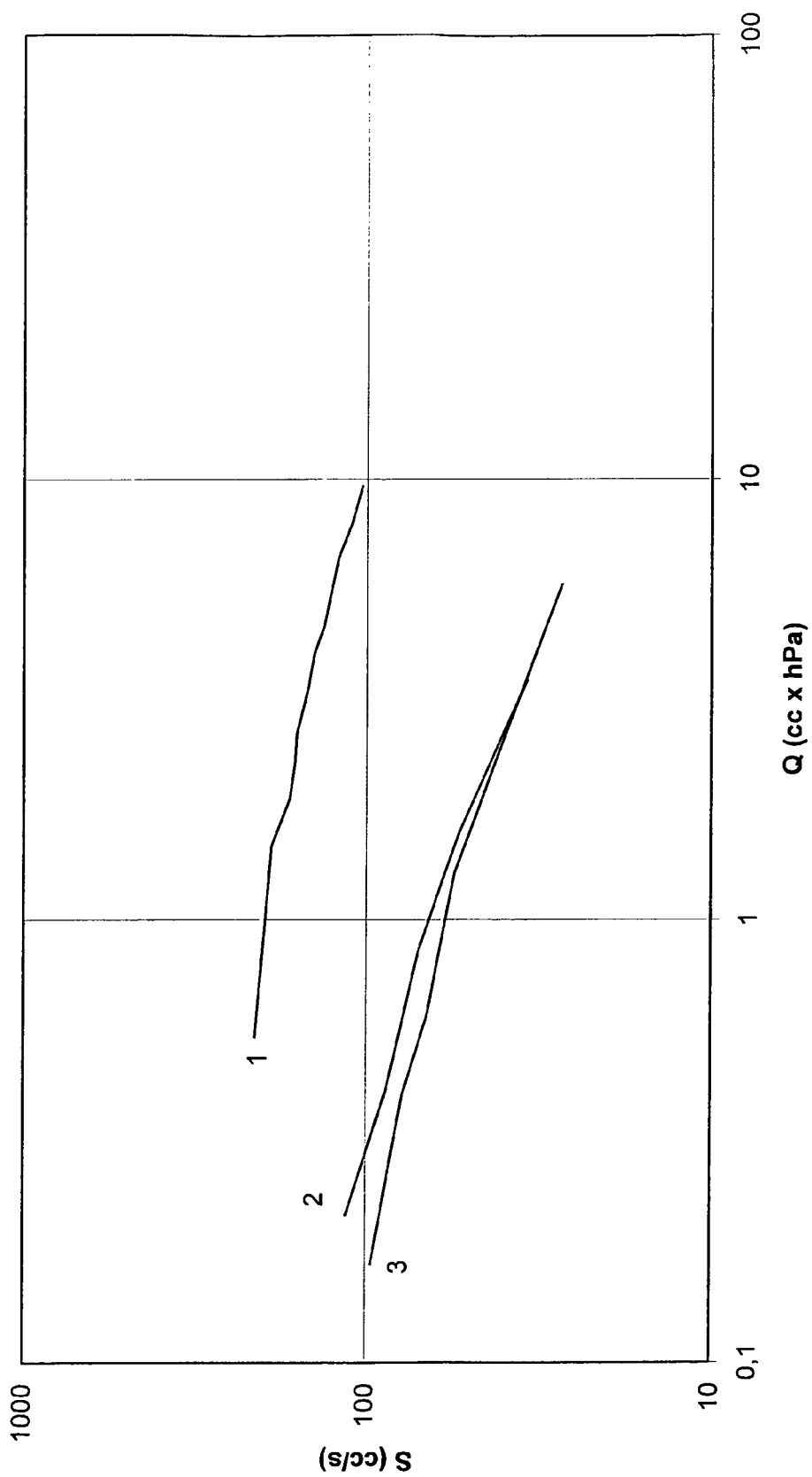

Finally, FIG. 6 shows that the alloys according to an embodiment of the invention also have better sorption properties for an oxygenated gas (CO) compared to the same two prior art alloys employed for the comparison of examples 3 and 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A non-evaporable getter alloy consisting of, by weight, from 60% to 85% yttrium, from 5% to 30% manganese and from 5% to 20% aluminum.

2. The alloy according to claim 1 having a weight composition of 75% Y, 15% Mn, and 10% Al.

3. The alloy according to claim 1 having a weight composition of 70% Y, 18% Mn, and 12% Al.

4. A non-evaporable getter device comprising the alloy of claim 1 in a form of a powder having a particle size of less than 250 μm.

5. The device according to claim 4, wherein the powder has a particle size of between 40 and 125 μm.

6. The device according to claim 4, wherein the powder has been compressed into a shape of a pill and the powder consists of the getter alloy.

7. The device according to claim 4, wherein the powder is supported on a metallic strip (31) and has been adhered to the metallic strip by cold rolling or deposition followed by sintering.

8. The device according to claim 4, comprising a container (41) with an upper opening (42), wherein the powder is inside the container.

9. The device according to claim 4, comprising a container (51) and an opening closed by a porous septum (53), wherein the powder is inside the container.

* * * * *